Figure 1:
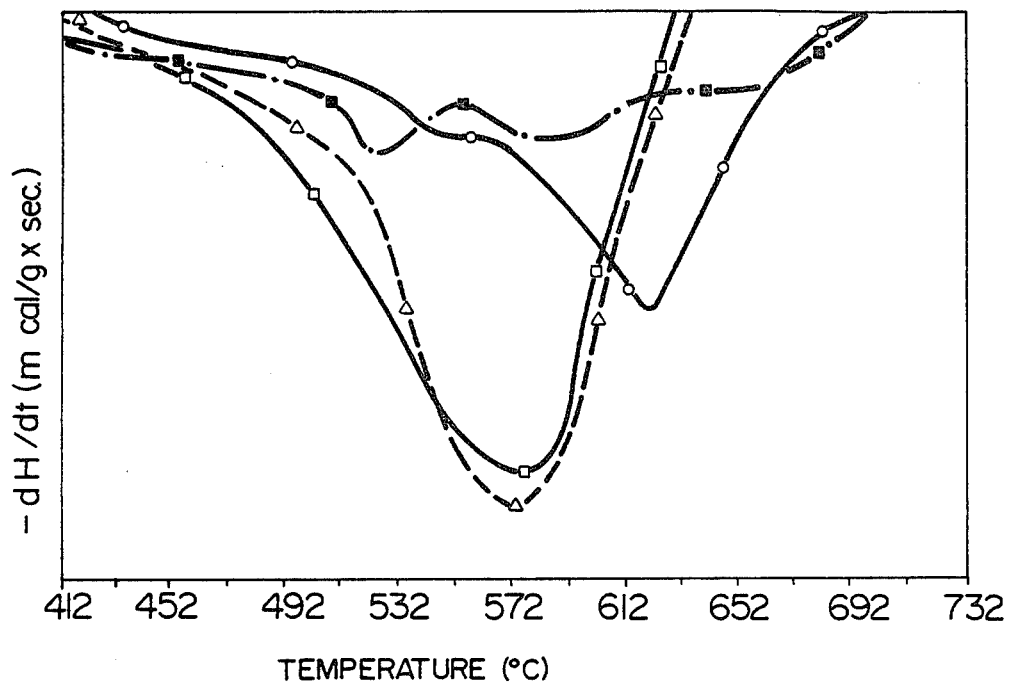

United States Patent [19]

Santos et al.

[11] Patent Number: 4,480,068
[45] Date of Patent: Oct. 30, 1984

[54] HIGH TEMPERATURE RESISTANT BINDERS

[75] Inventors: Ruben A. Santos, Sarnia; William G. Kipp, Courtright; Edwin J. MacPherson, Sarnia, all of Canada

[73] Assignee: Fiberglas Canada Inc., Ontario, Canada

[21] Appl. No.: 302,256

[22] Filed: Sep. 14, 1981

[51] Int. Cl.$^3$ .................. C08K 3/28; C08K 3/38; C08L 6/10
[52] U.S. Cl. .................. 524/456; 524/186; 524/595; 524/596; 524/597; 524/598; 525/495; 525/504; 525/506
[58] Field of Search .................. 525/506, 504, 495; 524/595, 596, 597, 598

[56] References Cited

U.S. PATENT DOCUMENTS

| 1,969,761 | 8/1934 | Rosenblum | 505/54.45 |
|---|---|---|---|
| 2,197,855 | 4/1940 | Ellis | 527/604 |
| 2,667,466 | 1/1954 | Nagy | 528/129 |
| 2,748,101 | 5/1956 | Shappell | 524/405 |
| 2,931,738 | 4/1960 | Stalego | 428/375 |
| 2,941,904 | 6/1960 | Stalego | 523/508 |
| 2,990,307 | 6/1961 | Stalego | 162/165 |
| 3,001,929 | 9/1961 | Moy et al. | 208/136 |
| 3,002,857 | 10/1961 | Stalego | 428/378 |
| 3,004,941 | 10/1961 | Mestdagh et al. | 524/541 |
| 3,218,279 | 11/1965 | Stalego | 524/157 |
| 3,223,668 | 12/1965 | Stalego | 428/273 |
| 3,624,246 | 11/1971 | Deuzeman | 528/245.5 |
| 3,740,358 | 6/1973 | Christie et al. | 521/103 |
| 3,846,275 | 11/1974 | Urban | 208/10 |
| 3,956,204 | 5/1976 | Higginbottom | 428/290 |
| 4,045,398 | 8/1977 | Dahms | 428/436 |
| 4,112,188 | 9/1978 | Dahms | 428/436 |
| 4,130,538 | 12/1978 | Shutt | 523/129 |
| 4,176,105 | 11/1979 | Miedsner | 525/504 |
| 4,182,697 | 1/1980 | Schmidt | 525/506 |
| 4,235,950 | 11/1980 | Miedaner | 428/36 |
| 4,251,590 | 2/1981 | Rubright et al. | 428/285 |
| 4,272,403 | 6/1981 | Meyer et al. | 524/595 |

FOREIGN PATENT DOCUMENTS 981827 1/1976 Canada.
1001788 12/1976 Canada.

Primary Examiner—Allan M. Lieberman
Attorney, Agent, or Firm—Parkhurst & Oliff

[57] ABSTRACT

A phenol-formaldehyde resol to which urea has been added is mixed with a boric acid-hydroxyl-amide component to provide high temperature resistant binder compositions for use in the manufacture of thermally stable bonded mineral fibre insulation structures.

33 Claims, 1 Drawing Figure

DIFFERENTIAL SCANNING CALORIMETRY
DECOMPOSITION PROFILES

|  | $\Delta H_{DECOMPOSITION}$ (CAL/g) |
|---|---|
| △ – RESIN/UREA/DICYANDIAMIDE | 2455 |
| □ – RESIN/UREA/DICYANDIAMIDE+SORBITOL | 2405 |
| ○ – RESIN/UREA/DICYANDIAMIDE+BORIC ACID | 1498 |
| ■ – RESIN/UREA+SORBITOL/BORIC ACID/DICYANDIAMIDE | 704 |

HIGH TEMPERATURE RESISTANT BINDERS

This invention relates to a high temperature resistant binder composition for use in bonding mineral fibers.

The binder systems generally used in mineral fiber insulation products contain water-soluble thermo-setting resins based on phenol-formaldehyde type resols.

One of the important uses of mineral fiber thermal insulation is its application to pipelines, vessels, and tanks operating at elevated temperatures. When the operating temperature of such a device is much in excess of 200° to 250° C. most organic binders which hold the insulating fibers together decompose in a process of thermal degradation.

For insulated vessels operating at temperatures of 450° C. this heat built up from the decomposing binder may cause the temperature within the mineral fiber insulation to rise in excess of the operating temperature of the vessel. For most general purpose insulation binders which have not specifically been formulated to have a controlled rate of thermal degradation the temperatures generated may rise in excess of 500° C. At times, the thus generated heat cannot be dissipated through the insulation and the rise in temperature can cause the mineral fibers to melt, flow and sinter resulting in complete product failure. This exothermic decomposition occurs at up to 450° C.

To overcome these problems a variety of attempts have been made to design special binder systems for use in insulating material adapted to withstand high temperatures.

In general, the resins used for these types of applications have been limited to phenol-formaldehyde resins which are modified with nitrogen-containing compounds, such as urea, dicyandiamide and melamine in various combinations. Binders containing such modified resins are formulated to decompose at controlled rates limiting the rate of heat build-up and thereby keeping the temperature within the insulation below the softening point of the mineral fiber. In the case of glass fibers the softening point is generally about 600° C. On decomposition these modified binders are believed to generate nitrogen gas which blankets the areas surrounding the decomposing binder. It is this blanket of inert gas which is thought to be responsible for slowing the thermal oxidative processes which occur in the phenolic part of the binder as it decomposes.

Nitrogen modified resin systems of this type are described in U.S. Pat. No. 3,624,246, of Nov. 30, 1971 and 3,956,204 of May 11, 1976. They have, to some extent, been successful in allowing glass fiber insulation manufacturers to specify their product for use up to 350° C. The nitrogen modified resins, for the most part, are difficult to manufacture, and have poor storage stability, short gel times and poor processability. In addition, they are expensive and do not always provide an adequate margin of safety for insulation materials which must be used at the upper temperature limit.

It is also generally known that compounds derived from boric acid are useful in imparting flame retarding properties to various plastic materials. Studies disclosed in U.S. Pat. Nos. 2,990,307 and 3,218,279 to Stalego have shown that the addition of a borated alkyd resin and/or a borated urea-formaldehyde resin to a phenolic resin can impart improved temperature resistant properties to the phenolic resin.

Studies disclosed in U.S. Pat. No. 4,176,105 to Miedaner show that the temperature resistance of binders can be increased by the addition of boron compounds to modified phenolic resins.

Attempts to employ borates in sufficient quantities needed to give the binder improved thermal resistance have frequently resulted in resins which exhibit poor storage stability and poor tensile strength properties. The reason for this seems to be that the addition of larger amounts of boric acid disrupts the cure properties of the binder and, thus, affects the final strength of the bonds which are formed.

Resins and binder systems can cure by a number of mechanisms. In insulation products, heat is normally applied to cure the binders. Adjustments may be made to the cure rate by changing the true pH of the binder system. To that end small amounts of acidic materials, such as boric acid, ammonium phosphate and ammonium sulfate, may be added to these resins to catalyse the cure. In practice, a resin is treated with urea, oil emulsion, silane and sometimes sulphate etc. to make the binder system, and then the pH of the mixture is adjusted upwards with ammonium hydroxide to stabilize the system prior to use and to provide extra ammonia to protect the binder system while it is sprayed onto the hot glass fibers. The extra ammonia is usually flashed off at this point and the binder is thought to revert to a lower pH. It then begins to cure. The acidic materials added to the system speed up this cure. Boric acid is an acidic system and can be used to speed up curing of the binder. If boric acid is present in large amounts, it can accelerate the curing of the binder to such an extent that the strength properties of the cured binder are significantly reduced. The reasons for this are not certain, but may lie in the way in which the phenolic monomers join together to form oligomers to produce a cured product. In a very fast curing resin these reactions proceed quickly and, as the resin viscosity increases faster than normal due to the catalysis effect, the number of reactive groups which are not able to "find partners" increases. Thus, binder systems containing larger amounts of boric acid are prone to pre-cure during the forming of the initial insulation fiber pack which is then molded and cured in the shape of pipe insulation, boards, etc. This tendency to pre-cure results in a binder with poor strength properties and inferior durability and consequently in products which lack adequate finished properties.

Accordingly, it is an object of the present invention to provide high temperature resistant binder compositions suitable for use in binder systems applied to mineral fibers in the manufacture of thermal insulating products. The compositions, when cured, have improved tensile strength properties and, when subjected to high temperatures, exhibit a controlled rate of decomposition.

It is a further object of the invention to provide high temperature resistant binder compositions which exhibit improved processing qualities.

It has now been found that a high temperature resistant binder composition suitable for use in binder systems applied to mineral fibers in the manufacture of thermal insulation products for high temperature service, especially glass fiber products, can be prepared by adding to a general purpose phenol-formaldehyde resin system containing urea, an amide such as dicyandiamide and other usual additives, a pre-mixed boric acid-hydroxyl component.

In one aspect of the invention there is provided a method of preparing a high temperature resistant, thermo-setting, water-dilutable binder composition suitable for use in a binder system for mineral fibers, comprising mixing at a temperature of about 20° to 80° C. in an aqueous medium (a) a mixture of 1 mole of boric acid and about 0.9 to 2 moles of a soluble hydroxyl compound chosen from diol, polyol, aldose and ketose, (b) about 0.5 to 1.5 moles of a nitrogen containing compound chosen from dicyandiamide, melamine and guanidine, and (c) a phenol-formaldehyde resol to which urea has been added. The phenol-formaldehyde resol-urea mixture which has a pH in the range of 7.5 to 10 is added in a weight ratio of between 2:1 and 3:1 to the weight of components (a) and (b), and contains urea in the ratio of phenol-formaldehyde to urea between 70:30 and 40:60 parts by weight. The phenol-formaldehyde resol has a phenol to formaldehyde molar ratio of between 1:3 and 1:4.5. The pH of the resulting composition is adjusted to between 8.5 and 9.5.

In a further aspect of the invention there is provided a high temperature resistant, thermo-setting, water-dilutable binder composition suitable for use in the manufacture of thermally stable bonded mineral fiber structures, comprising in a ratio of between 1:2 and 1:3 parts by weight a boric acid-hydroxyl-amide component and a phenol-formaldehyde resol to which urea has been added. The boric acid-hydroxylamide component is prepared by mixing at a temperature of about 20° to 80° C. in an aqueous medium 1 mole of boric acid with about 0.9 to 2 moles of a soluble hydroxyl compound chosen from diol, polyol, aldose and ketose and adding about 0.5 to 1.5 moles of a nitrogen containing compound chosen from dicyandiamide, melamine and guanidine. The phenol-formaldehyde resol-urea mixture has a pH in the range of 7.5 to 10 and contains urea in a ratio of phenol-formaldehyde to urea between 70:30 and 40:60 parts by weight. The phenol-formaldehyde resol has a phenol to formaldehyde molar ratio of between 1:3 and 1:4.5. The composition has a pH adjusted to between 8.5 and 9.5.

Phenol-formaldehyde resins which have been found to be particularly useful in the preparation of high temperature resistant binder compositions according to the invention are based on the alkali catalyzed condensation of phenol with formaldehyde such as described in Canadian Patent No. 1,080,871 issued July 1, 1980 of the same assignee, the disclosure of which is hereby incorporated by reference. The preferred phenol-formaldehyde resols have a phenol to formaldehyde molar ratio of between 1:2.8 and 1:4.5, preferably of 1:3.7. These resols are reacted with di- or poly-functional amide or amine compounds such as urea, dicyandiamide and melamine. The phenol-formaldehyde resol is reacted with urea in a ratio of phenol-formaldehyde to urea between 70:30 and 40:60 parts by weight, preferably of between 60:40 and 50:50 and most preferably of 54:46 parts by weight. The pH of the phenol-formaldehyde resol-urea mixture is generally in the range of 7.5 to 10.

The term binder composition as used herein means a relatively stable water-dilutable composition, and the term binder system is intended to mean the diluted binder composition including other components and processing aids ready for application to a mineral fiber which, when cured, forms a resin which bonds together the fibers of the mineral fiber insulation product.

Hydroxyl compounds suitable for preparing the intermediate boric acid-hydroxyl component include diols, polyols, aldoses and ketoses. A preferred group of compounds are di- or polyhydroxyl compounds which appear to form a complex, possibly in the form of a 5- or 6-membered ring, with boric acid. Polyols having cis-geminal hydroxyl groups are one group of compounds which give good results. Materials which give good results include sorbitol, mannitol, pentaerythritol and glycerol, alone or in combination with an aldose, such as glucose, a ketose, such as fructose and/or ethylene glycol. A particularly preferred hydroxyl compound is sorbitol.

Boron compounds suitable for use in preparing this intermediate condensate are boric acid and borates. The term boric acid is used hereafter in describing the compositions, though it will be understood that such description applies as well to the use of analogous borates.

Nitrogen containing compounds compounds suitable for preparing the boric acid-hydroxyl-amide component include poly-functional amides such as dicyandiamide, melamine and guanidine. A particularly preferred amide is dicyandiamide.

In a preferred embodiment of the method according to the invention 1 mole of boric acid is mixed at 20° to 80° C. in an aqueous medium with 0.9 to 2.0 moles of a soluble hydroxyl compound to form a boric acid-hydroxyl component to which 0.5 to 1.5 moles of amide are added to yield a boric acid-hydroxyl-amide component. Furthermore, 0.05 to 0.15 moles of calcium silicate per mole of boric acid may be added.

The addition of calcium silicate is optional. Calcium silicate is thought to modify the cure characteristics of the binder system and may also influence the way in which the binder decomposes in that it assists in the divitrification of glass fibres at high temperature. A measure of divitrification is thought to be beneficial, since, when the binder starts to decompose, divitrification will provide a degree of integrity to the insulating material formed of glass fibres and the present binder system. Calcium silicate may also serve to render the cured binder system substantially non-corrosive. This may be useful when in the finished insulated product the binder is in contact with metal. Since the binder contains boric acid, it may be expected to cause corrosion in the event that moisture is present at some time during the life time of the insulation.

To prepare a preferred high temperature resistant binder composition according to the invention the boric acid-hydroxyl-amide component which may contain calcium silicate, is added to the phenolic resin in a ratio of between about 1:2 and 1:3 parts by weight. The pH is adjusted to between 8.5 and 9.5, preferably to between 8.8 and 9.2, generally with ammonia, normally as ammonium hydroxide.

Treatment of the phenolic resin with the boric acid-hydroxyl component does not unduly affect such properties of the phenolic resin as gel time and tensile strength. However, the heat resistance of the phenolic resin is greatly enhanced by the addition of the boric acid-hydroxyl component. It appears that a kind of complex formation occurs between boric acid and the hydroxyl compound converting the boric acid in such a way that the resulting boric acid-hydroxyl component does not interfere significantly with the way the resin cures. The exact mechanism of the interaction between the boric acid-hydroxyl component and the phenolic resin on curing is not known.

In the preparation of the preferred boric acid-sorbitol component an aqueous solution of about 8 to 12 parts by weight of sorbitol may preferably be heated to approximately 50° to 70° C. and treated with about 3 to 5 parts by weight of boric acid. The mixture is agitated until a clear solution is achieved. The pre-mixing of boric acid with sorbitol appears to facilitate solubilization of the boric acid in the phenolic resin.

To form the preferred boric acid-sorbitol-dicyandiamide component about 4 to 6 parts by weight of dicyandiamide may be added to the clear aqueous mixture of boric acid and sorbitol.

In a more preferred embodiment of the invention a small amount of calcium silicate, preferably about 0.05 to 0.15 moles per mole of boric acid, and more preferably about 1 part by weight, may be added to the boric acid-sorbitol-dicyandiamide component.

To prepare a preferred binder composition according to the invention about 15 to 23 parts by weight of the boric acid-sorbitol-dicyandiamide component are mixed with 35 to 55 parts by weight of phenol-formaldehyde resol-urea.

To demonstrate the importance of the way and order in which the various components of the binder composition are mixed the gel time, dry and wet tensile =strength, heat released on decomposition and decomposition profiles were determined and compared.

The gel time of a binder composition gives an indication of its curing time and provides insight into the processability of a particular composition. Gel times of 1000 and 1300 seconds are desirable. Gel times much in excess of 1300 seconds may result in curing difficulties, while gel times much less than 1000 seconds indicate that the composition has a tendency to pre-cure which adversely affects processability of the binder composition. Under certain conditions gel times as low as 800–900 seconds may be operable.

The dry tensile and, to a greater extent, the wet tensile strength of a composition have been found to bear a correlation to the long term durability and bonding strength of a binder system based on such a composition.

Binder compositions which show good tensile strength are considered to be durable. Typically, a wet tensile strength of 400 psi is considered to be the lower limit which will give the finished insulation product an adequate durability on ageing.

The decomposition heat shows the total amount of heat which is released when one gram of the binder composition decomposes due to thermal degradation. The decomposition profile illustrates the rate of heat evolution on decomposition of the binder composition and the temperature at which the decomposition occurs. The curve indicates whether the binder decomposes practically instantaneously upon reaching a certain critical temperature or whether the binder decomposes at a controlled rate over a broad range of temperatures. For a binder composition intended for use at elevated temperatures it is important that the temperature at which decomposition starts is as high as possible, that the energy generated on decomposition is kept as low as possible, and that the decomposition process occurs gradually so that heat released in the process can be dissipated.

The tests which are mentioned in the specification have been carried out in the following manner:

DRY AND WET TENSILE STRENGTHS

The binder composition was combined with silicone and glass microbeads. The mixture was formed into dog-bones (test bars which are thicker at the ends) and cured. The ignition loss of the dog-bone samples was maintained at about 3%. One half of the dog-bones were broken dry using a Scott tester and the other half were subjected to saturated steam under pressure and then tested.

GEL TIME

A brass cup was provided with a heating device suitable for maintaining a constant temperature of 130° C.±1° C. A 42%–50% solution of the binder composition was placed in a cup and stirred with a glass stirring rod. As the end-point approaches, test pulls were made by lifting the rod approximately 2" out of the sample with quick pulls. The end-point was reached when the pulled thread breaks and "snaps back" showing elasticity. The time was noted and recorded in seconds.

PERCENT SOLIDS

The percentage of total solids was determined by heating the composition in a drying oven at 150° C. for 2 hours. The percent solids are indicative of the losses which might be expected on curing under static conditions.

DECOMPOSITION PROFILES

The heat of decomposition ($\Delta H_{Decomposition}$ in cal/g) was measured on a Perkin Elmer Differential Scanning Calorimeter (DSC II) by accurately weighing in to a sample pan approximately 2 to 3 mg of the solid binder materials obtained after curing in a drying oven for two hours at 150° C. The hermetically sealed sample pans were then run on the DSC II using a heating rate of 20° C./minute and a sensitivity of 40.

The scans for the various samples were normalized as to the sample weight and the corrected decomposition profiles drawn out for comparison purposes. The area under the curve is the $\Delta H_{Decomposition}$.

EXAMPLE 1

Preparation of a Preferred High Temperature Resistant Binder Composition (a) A calcium catalyzed phenol-formaldehyde resol containing 3.7 moles of formaldehyde per mole of phenol and 5% calcium based on the weight of phenol was prepared according to the procedure described in Canadian Patent No. 1,080,871. The resin was neutralized with carbon dioxide to a pH of 8.2.

(b) To 54 parts by weight (as resin solids) of the phenol formaldehyde resol of (a) was added 46 parts by weight of urea. The mixture was allowed to stir and react to yield a phenol-formaldehyde resol-urea mixture.

(c) A commercial 70% sorbitol solution containing 10.7 parts by weight of sorbitol was heated to 60° to 65° C. and treated with 3.9 parts of boric acid. After mixing for half an hour a clear solution resulted which was treated with 5.0 parts by weight of dicyandiamide. Following the addition of dicyandiamide 1.0 part by weight of calcium silicate was added.

(d) To prepare the high temperature resistant binder composition 45 parts by weight of phenol-formaldehyde resol-urea mixture as prepared in (b) was added to 20.6 parts by weight of the boric acid-sorbitol-dicyandiamide-calcium silicate component as prepared in (c). The pH was adjusted to between 8.8 and 9.0 with ammonium hydroxide.

Gel time of a 50% solution measured at 130° C.:1050 sec
Dry tensile strength: 433.8 psi
Wet tensile strength: 501.8 psi
Total solids: 48.27%
ΔH decomposition: 1090 cal/g

EXAMPLE 2

Effect of the Addition of Boric Acid and Sorbitol to a Phenol-Formaldehyde Resol-Urea Mixture To 45 parts by weight (as resin solids) of a phenol-formaldehyde resol to which urea had been added (as prepared in Example 1 (b)) the following compounds were added in parts by weight:

(1) 5 parts dicyandiamide;
(2) 5 parts dicyandiamide and 3.9 parts boric acid, separately;
(3) 5 parts dicyandiamide and 10.7 parts sorbitol, separately:
(4) 5 parts dicyandiamide and the reaction product of 3.9 parts boric acid and 10.7 parts sorbitol;
(5) the reaction product of 3.9 parts boric acid, 10.7 parts sorbitol and 5 parts dicyandiamide; and
(6) the reaction product of 3.9 parts boric acid, 10.7 parts sorbitol, 5 parts dicyandiamide and 1 part calcium silicate.

Gel times, total solids, tensile strengths, heat release on decomposition and decomposition profiles of each sample were determined. The results are tabulated in Table I and illustrated in FIG. 1.

Referring to Table I and FIG. 1 it can be seen that the addition of 7.8% of boric acid to the phenol-formaldehyde resol-urea and dicyandiamide mixture of Sample (1) changes the physical properties of the composition considerably. Sample (1) exhibits a gel time which allows relatively easy processing of the composition and shows tensile strengths which appear adequate for most insulation uses. However, a binder system based on sample (1) can only be used for applications up to about 345° C. In Sample (2) the gel time, the dry and wet tensile strength as well as the amount of heat released on decomposition are reduced substantially. Of particular concern is the drop of the wet tensile strength which indicates a decrease in bonding strength and durability of the binder system based on a composition such as Sample (2). The dry tensile strength is lower but still adequate. The decrease in gel time indicates the tendency to pre-cure, whereas the reduction in heat released on decomposition together with a higher temperature of decomposition points to the increased temperature resistance of this sample.

When sorbitol was added to Sample (1) the tensile strength also drops somewhat. This may be due to the dilution effect of the sorbitol. Gel time and decomposition heat were not affected.

Sample (4) in which sorbitol and boric acid were mixed prior to their addition to Sample (1) exhibits a reasonable level of tensile strength. The gel time remains practically unchanged when compared with Sample (1). The amount of heat released on decomposition is greatly reduced and the rate of decomposition is considerably smaller than in any of the preceding samples indicating that a binder system based on Sample (4) will be suitable for applications at elevated temperatures. From these results it can be seen that complexation of the boric acid with a hydroxyl compound such as sorbitol allows the addition of sufficient boric acid to render the binder composition temperature resistant up to about 450° C. while maintaining adequate processing and strength properties.

In Sample (5) sorbitol, boric acid and dicyandiamide were mixed prior to being added to the phenol-formaldehyde resol-urea mixture. Gel time and wet and dry tensile strength of the resulting binder composition are similar to the corresponding parameters of Sample (4), whereas the amount of heat released on decomposition is further reduced. As can be seen from the decomposition profile of Sample (5) in FIG. 1, the rate of decomposition is small indicating that decomposition occurs very gradually. This controlled rate of decomposition renders a binder system based on Sample (5) very useful for applications up to 455° C. It is thought that the method of Sample (6) may yield a more ordered composition than the method of Sample (5). On curing Sample (6) may thus give rise to a more regular structure and, hence, to a lower heat of decomposition.

Sample (6) in which a mixture of sorbitol, boric acid, dicyandiamide and calcium silicate was added to the phenol-formaldehyde resol-urea shows characteristics similar to Sample (5). The amount of heat released on decomposition is slightly higher than for Sample (5). This may be due, in part to the addition of calcium silicate and in part to the error inherent in the method of determining ΔH $_{Decomposition}$ by measuring the area under the decomposition profile. The properties of Sample (6) are quite similar to the properties of Sample (5), particularly with respect to higher temperature resistance.

TABLE I

PHYSICAL PROPERTIES OF VARIOUS HIGH TEMPERATURE BINDER COMPOSITIONS FOR MINERAL WOOL PRODUCTS

| Sample # | | Weight of Ingredients as Solids (g) | pH | Gel Time (sec.) | Oven Solids (%) (150° C. for 2 hrs.) | Tensile Strengths* Dry (psi) | Wet (psi) | ΔH Decomposition (Cal/g) | Processibility and Temperature Limit |
|---|---|---|---|---|---|---|---|---|---|
| 1. | Resin | 24.3 | 8.3 | 1100 | 46.08 | 755.6 | 667.6 | 2455 | This binder will process be limited to 345° C. in application temperature |
| | Urea | 20.7 | | | | | | | |
| | Dicyandiamide | 5.0 | | | | | | | |
| 2. | Resin | 24.3 | 9.0 | 875 | 46.00 | 418.7 | 119.1 | 1498 | This binder will be difficult to process due to the short gel time and the product will be weak |
| | Urea | 20.7 | | | | | | | |
| | Dicyandiamide | 5.0 | | | | | | | |
| | Boric Acid | 3.9 | | | | | | | |

TABLE I-continued

PHYSICAL PROPERTIES OF VARIOUS HIGH TEMPERATURE BINDER COMPOSITIONS FOR MINERAL WOOL PRODUCTS

| Sample # | | Weight of Ingredients as Solids (g) | pH | Gel Time (sec.) | Oven Solids (%) (150° C. for 2 hrs.) | Tensile Strengths* Dry (psi) | Wet (psi) | Δ H Decomposition (Cal/g) | Processability and Temperature Limit |
|---|---|---|---|---|---|---|---|---|---|
| 3. | Resin | 24.3 | 9.0 | 1090 | 45.17 | 664.4 | 415.1 | 2405 | This binder will process but will be limited to 345° C. in application temperature |
| | Urea | 20.7 | | | | | | | |
| | Dicyandiamide | 5.0 | | | | | | | |
| | Sorbitol | 10.7 | | | | | | | |
| 4. | Resin | 24.3 | 9.1 | 1125 | 47.78 | 483.1 | 481.5 | 1284 | This binder will have a limited shelf life but the cured binder will be suitable for use up to 455° C. |
| | Urea | 20.7 | | | | | | | |
| | Dicyandiamide | 5.0 | | | | | | | |
| | Sorbitol/Boric Acid | 10.7/3.9 | | | | | | | |
| 5. | Resin | 24.3 | 9.2 | 1075 | 47.60 | 432.0 | 475.0 | 704 | This will process well and the cured binder will be suitable for use up to 455° C. |
| | Urea | 20.7 | | | | | | | |
| | Dicyandiamide | 5.0 | | | | | | | |
| | Sorbitol | 10.7 | | | | | | | |
| | Boric Acid | 3.9 | | | | | | | |
| 6. | Resin | 24.3 | | | | | | | This material will process well and the cured binder will be useful for temperatures up to 455° C. |
| | Urea | 20.7 | | | | | | | |
| | Sorbitol | 10.7 | | | | | | | |
| | Boric Acid | 3.9 | | | | | | | |
| | Dicyandiamide | 5.0 | | | | | | | |
| | Calcium Silicate | 1.0 | | | | | | | |

*The ingnition loss of the tensile samples was maintained at about 3%.

EXAMPLE 3

Effect of Different Amounts of Boric Acid and Sorbitol on the Properties of the Binder Composition To 45 parts by weight of phenol-formaldehyde resolurea as prepared in Example 1 (b) 5 parts by weight of dicyandiamide were added. To this resin the following amounts of boric acid and sorbitol were added in parts by weight:

(a) 3.9 parts of boric acid and 10.7 parts of sorbitol corresponding to a molar ratio of 1:0.91;

(b) 3.9 parts boric acid and 11.6 parts sorbitol corresponding to a molar ratio of 1:1;

(c) 3.34 parts of boric acid and 4.9 parts of sorbitol corresponding to a molar ratio of 1:0.5; and (d) 4.45 parts boric acid and 19.65 parts sorbitol corresponding to a molar ratio of 1:1.5.

For each composition the gel time, total solids, tensile strength and decomposition heat were determined. The results are tabulated in Table II.

From the table it can be seen that a reduction in the amount of sorbitol in the binder composition as in Sample (3) results in a decrease in gel time and wet tensile strength and in an increase in the amount of heat released on decomposition when compared with Samples (1) and (2).

A considerable increase in the sorbitol content of the composition, on the other hand, increases the gel time without considerable change in wet tensile strength and decomposition heat.

TABLE II

PHYSICAL PROPERTIES OF VARIOUS HIGH TEMPERATURE BINDER COMPOSITIONS

| Sample # | | Weight of Ingredients as Solids (g) | Molar Ratio | pH | Gel Time (sec.) | Oven Solids (%) (150° C. for 2 hrs.) | Tensile Strengths* Dry (psi) | Wet (psi) | Δ H Decomposition (Cal/g) |
|---|---|---|---|---|---|---|---|---|---|
| 1. | Resin | 24.3 | | 9.0 | 1090 | 47.56 | 418.7 | 512.9 | 1019 |
| | Urea | 20.7 | | | | | | | |
| | Dicyandiamide | 5.0 | | | | | | | |
| | Sorbitol | 10.7 | 0.91 | | | | | | |
| | Boric Acid | 3.9 | 1 | | | | | | |
| 2. | Resin | 24.3 | | 9.0 | 1095 | 48.05 | 389.0 | 423.1 | 962 |
| | Urea | 20.7 | | | | | | | |
| | Dicyandiamide | 5.0 | | | | | | | |
| | Sorbitol | 11.6 | 1 | | | | | | |
| | Boric Acid | 3.9 | 1 | | | | | | |
| 3. | Resin | 24.3 | | 9.0 | 925 | 47.28 | 550.0 | 338.0 | 1448 |
| | Urea | 20.7 | | | | | | | |
| | Dicyandiamide | 5.0 | | | | | | | |
| | Sorbitol | 4.9 | 0.5 | | | | | | |
| | Boric Acid | 3.34 | 1 | | | | | | |
| 4. | Resin | 24.3 | | 9.0 | 1210 | 49.39 | 321.3 | 436.0 | 960 |
| | Urea | 20.7 | | | | | | | |
| | Dicyandiamide | 5.0 | | | | | | | |
| | Sorbitol | 19.65 | 1.5 | | | | | | |
| | Boric Acid | 4.45 | 1 | | | | | | |

*The ignition loss of the tensile samples was maintained at about 3%.

EXAMPLE 4

Comparison Between a Prior Art Binder Composition and the Binder Composition According to the Invention A binder composition was prepared according to Example 2 of U.S. Pat. No. 4,176,105. A dicyandiamide modified phenolformaldehyde resol available commercially was reacted in an aqueous solution with urea and, thereafter, with boric acid. The gel time, total solids, tensile strength and decomposition heat were determined for the pure resol, the resol reacted with urea and the resol reacted with urea and boric acid. The results are tabulated in Table III. Also shown in Table III are the parameters of the preferred binder composition according to the present invention. From the data in Table III it can be seen that particularly the wet tensile strength and, thus, the bonding strength of the prior art phenol-formaldehyde-urea-boric acid composition is much lower than the wet tensile strength of the preferred binder composition according to the invention.

EXAMPLE 5

Effect of Different Hydroxyl and Amide Components on the Physical Properties of High Temperature Resistant Binder Compositions The binder compositions shown in Samples (1) to (8) of Table IV were prepared and the gel time and dry and wet tensile strength were measured.

When sorbitol was replaced by ethylene glycol as in Sample (3) the gel time of the composition increased and the wet tensile strength decreased considerably rendering the composition relatively low in bonding strength and durability. However, when sorbitol was only partly replaced by ethylene glycol the tensile strength of the composition remained substantially the same and only the gel time increased slightly. It follows that partial replacement of sorbitol with ethylene glycol can be used to lengthen the gel time of the composition and, thus, the cure time of a binder system based on such a composition, without adversely affecting other properties.

When sorbitol was partly or completely replaced by glycerol as in Samples (4) and (5) the gel time of the composition increased noticeably while the wet tensile strength increased only slightly. The gel time of a binder composition can thus be adjusted according to specific process requirements by varying between partial and complete replacement of sorbitol with glycerol.

Replacement of sorbitol with pentaerythritol as shown in Sample (6) resulted in a binder composition having about the same gel time and a slightly increased wet tensile strength as compared with Sample (1).

When sorbitol was replaced by mannitol as shown in Sample (8) the gel time increased slightly, whereas the wet tensile strength remained about the same.

Use of melamine instead of dicyandiamide as shown in Sample (7) resulted in a composition with a wet tensile strength which was about the same as in Sample (1), but which had a decreased gel time which may affect the processing properties of the composition to some extent.

TABLE III

PHYSICAL PROPERTIES OF PRIOR ART HIGH TEMPERATURE BINDER COMPOSITIONS

| Sample # | Weight of Ingredients as Solids (g) | Gel Time (sec.) | pH | Oven Solids (%) (150° C. for 2 hrs.) | Tensile Strengths≠ Dry (psi) | Tensile Strengths≠ Wet (psi) | Δ H Decomposition (Cal/g) |
|---|---|---|---|---|---|---|---|
| 1. Dicyandiamide modified phenol-formaldehyde resole* | 100.00 | 470 | 8.75 | 54.68 | 884.00 | 238.00 | 2831 |
| 2. Dicyandiamide modified phenol-formaldehyde resole* | 73.76 | 650 | 8.90 | 49.95 | 653.30 | 426.60 | 1965 |
| Urea | 35.00 | | | | | | |
| 3. Dicyandiamide modified phenol-formaldehyde resole* | 73.76 | 1285 | 9.10 | 48.30 | 392.40 | 104.00 | 1322 |
| Urea | 35.00 | | | | | | |
| Boric Acid | 11.25 | | | | | | |
| 4. Resin | 24.3 | | | | | | |
| Urea | 20.7 | | | | | | |
| Sorbitol | 10.7 | | | | | | |
| Boric Acid | 3.9 | | | | | | |
| Dicyandiamide | 5.0 | 1050 | 9.10 | 48.27 | 433.80 | 501.00 | 1090 |
| Calcium Silicate | 1.0 | | | | | | |

*This resin is a commercially available resole in use for high temperature mineral wool products.
≠The ignition loss of the tensile samples was maintained at about 3%.

TABLE IV

PHYSICAL PROPERTIES OF HIGH TEMPERATURE BINDER COMPOSITIONS USING DIFFERENT HYDROXYL AND AMIDE COMPONENTS

| Sample # | Wt. of Ingredients as Solids (g) | pH | Gel Time (sec.) | Tensile Strengths (psi)≠ Dry | Tensile Strengths (psi)≠ Wet |
|---|---|---|---|---|---|
| 1. Resin/Urea* | 36.94 | | | | |
| Sorbitol | 8.057 | | | | |
| Boric Acid | 2.920 | 9.0 | 1160 | 503 | 559 |
| Dicyandiamide | 3.694 | | | | |
| Calcium Silicate | 0.73 | | | | |
| 2. Resin/Urea | 36.94 | | | | |
| Sorbitol | 4.028 | | | | |
| Ethylene Glycol | 4.028 | | | | |
| Boric Acid | 2.92 | 9.0 | 1290 | 506 | 523 |
| Dicyandiamide | 3.694 | | | | |
| Calcium Silicate | 0.73 | | | | |
| 3. Resin/Urea | 36.94 | | | | |

TABLE IV-continued
PHYSICAL PROPERTIES OF HIGH TEMPERATURE BINDER COMPOSITIONS USING DIFFERENT HYDROXYL AND AMIDE COMPONENTS

| Sample # | | Wt. of Ingredients as Solids (g) | pH | Gel Time (sec.) | Tensile Strengths (psi)≠ Dry | Wet |
|---|---|---|---|---|---|---|
| | Ethylene Glycol | 8.057 | | | | |
| | Boric Acid | 2.92 | 9.0 | 1470 | 422 | 260 |
| | Dicyandiamide | 3.694 | | | | |
| | Calcium Silicate | 0.73 | | | | |
| 4. Resin/Urea | | 36.94 | | | | |
| | Sorbitol | 4.028 | | | | |
| | Glycerol | 4.028 | | | | |
| | Boric Acid | 2.92 | 9.0 | 1290 | 645 | 626 |
| | Dicyandiamide | 3.694 | | | | |
| | Calcium Silicate | 0.73 | | | | |
| 5. Resin/Urea | | 36.94 | | | | |
| | Glycerol | 8.057 | | | | |
| | Boric Acid | 2.92 | 9.0 | 1455 | 552 | 604 |
| | Dicyandiamide | 3.694 | | | | |
| | Calcium Silicate | 0.73 | | | | |
| 6. Resin/Urea | | 45.0 | | | | |
| | Pentaerythritol | 8.52 | | | | |
| | Boric Acid | 3.87 | 9.0 | 1215 | 590 | 638 |
| | Dicyandiamide | 5.0 | | | | |
| | Water | 5.68 | | | | |
| 7. Resin/Urea | | 41.4 | | | | |
| | Melamine | 4.15 | | | | |
| | Sorbitol | 10.36 | 9.0 | 935 | 524 | 513 |
| | Boric Acid | 3.75 | | | | |
| 8. Resin/Urea | | 45.48 | | | | |
| | Dicyandiamide | 4.55 | | | | |
| | Mannitol | 11.59 | 9.1 | 1240 | 354 | 536 |
| | Boric Acid | 3.93 | | | | |
| | Water | 15.518 | | | | |

*Resin/Urea - indicates a resin in which the ratio of phenol-formaldehyde to urea is 54:46 parts by weight
≠The ignition loss of the tensile samples was maintained at about 3%

We claim:

1. A method of preparing a high temperature resistant, thermosetting, water-dilutable binder composition suitable for use in a binder system for mineral fibers, comprising mixing at a temperature of about 20° to 80° C. in an aqueous medium
   (a) a mixture of 1 mole of boric acid and about 0.9 to 2 moles of soluble hydroxyl compound chosen from diol, polyol, aldose and ketose;
   (b) about 0.5 to 1.5 moles of a nitrogen containing compound chosen from dicyandiamide, melamine and guanidine; and
   (c) a phenol-formaldehyde resol to which urea has been added; said phenol-formaldehyde resol-urea mixture having a pH in the range of 7.5 to 10; and being added in a weight ratio of between 2:1 and 3:1 to the weight of components (a) and (b), and containing urea in the ratio of phenol-formaldehyde to urea between 70:30 and 40:60 parts by weight, and said phenol-formaldehyde resol having a phenol to formaldehyde molar ratio of between 1:3 and 1:4.5;
   and adjusting the Ph of the final composition to fall in the range of about 8.5 to 9.5.

2. A method of preparing a high temperature resistant, thermosetting, water-dilutable binder composition suitable for use in a binder system for mineral fibers, comprising:
   (a) mixing at a temperature of about 20° to 80° C. in an aqueous medium 1 mole of boric acid with about 0.9 to 2 moles of a soluble hydroxyl compound chosen from diol, polyol, aldose and ketose, and adding about 0.5 to 1.5 moles of a nitrogen containing compound chosen from dicyandiamide, melamine and guanidine;
   (b) mixing in a ratio of between 1:2 and 1:3 parts by weight the resulting boric acid-hydroxyl-amide component with a phenol-formaldehyde resol to which has been added urea, said penol-formaldehyde resol-urea mixture having a pH in the range of 7.5 to 10 and containing urea in a ratio of phenol-formaldehyde to urea between 70:30 and 40:60 parts by weight, and said phenol-formaldehyde resol having a phenol to formaldehyde molar ratio of between 1:3 and 1:4.5; and
   (c) adjusting the pH of the final composition to fall in the range of about 8.5 to 9.5.

3. A method as claimed in claim 2 wherein the phenolformaldehyde resol-urea mixture contains urea in a ratio of phenol-formaldehyde to urea between 60:40 and 50:50 parts by weight.

4. A method as claimed in claim 1 or 2 wherein the phenol-formaldehyde resol-urea contains urea in a ratio of phenol-formaldehyde to urea of 54:46 parts by weight.

5. A method as claimed in claim 1, 2 or 3 wherein the pH is controlled by addition of ammonia.

6. A method as claimed in claim 2 or 3, including addition of sufficient ammonium hydroxide in step (c) to adjust the composition to a pH of 8.8 to 9.2.

7. A method as claimed in claim 2 or 3 wherein about 0.05 to 0.15 moles of calcium silicate per mole of boric acid are added to the boric acid-hydroxyl amide component prior to step (b).

8. A method as claimed in claim 1, 2 or 3 wherein the hydroxyl compound is selected from the group consisting of sorbitol, mannitol, pentaerythritol, glycerol and mixtures thereof.

9. A method as claimed in claim 1, 2 or 3 wherein the hydroxyl compound is sorbitol.

10. A method as claimed in claim 1, 2 or 3 wherein the nitrogen containing compound is dicyandiamide.

11. A method as claimed in claim 1, 2 or 3 wherein the hydroxyl compound is sorbitol and the amide is dicyandiamide.

12. A method of preparing a high temperature resistant, thermosetting, water-dilutable binder composition suitable for use in a binder system for mineral fibers, comprising:
   (a) mixing at a temperature of between 50° to 70° C. in an aqueous medium about 3 to 5 parts by weight of boric acid with about 8 to 12 parts by weight of sorbitol;
   (b) adding about 4 to 6 parts by weight of dicyandiamide;
   (c) mixing about 15 to 23 parts by weight of the resulting boric acid-sorbitol-dicyandiamide component with 35 to 55 parts by weight of a substantially phenol free phenol-formaldehyde resol to which urea has been added; and
   (d) adjusting the pH of the final composition to fall in the range of about 8.5 to 9.5.

13. A method as claimed in claim 12 wherein about 1 part by weight of calcium silicate is added to the boric acid-sorbitol-dicyandiamide component prior to step (c).

14. A method as claimed in claim 12 wherein the phenol-formaldehyde resol to which urea has been added has a pH in the range of 7.5 to 10 and contains urea in a ratio of phenol-formaldehyde to urea between 70:30 and 40:60 parts by weight, and the phenol-formaldehyde resol has a phenol to formaldehyde molar ratio of between 1:3 and 1:4.5.

15. A method as claimed in claim 14 wherein the phenol-formaldehyde resol to which urea has been added contains urea in a ratio of phenol-formaldehyde to urea between 60:40 and 50:50 parts by weight.

16. A method as claimed in claim 12, 13 or 14 wherein the phenol-formaldehyde resol to which urea has been added contains urea in a ratio of phenol-formaldehyde to urea of 54:46 parts by weight.

17. A method of preparing a high temperature resistant, thermosetting, water-dilutable binder composition suitable for use in a binder system for mineral fibers, comprising:

(a) mixing at a temperature of about 60° to 65° C. in an aqueous medium 3.9 parts by weight of boric acid with 10.7 parts by weight of sorbitol until a clear solution is achieved;

(b) adding 5 parts by weight of dicyandiamide;

(c) mixing 20.6 parts by weight of the resulting boric acid-sorbitol-dicyandiamide component with 45 parts by weight of a phenol-formaldehyde resol to which urea has been added, said phenol-formaldehyde resol-urea mixture having an initial pH of about 8.2 and containing urea in a ratio of phenolformaldehyde to urea of 54:46 parts by weight, and said phenol-formaldehyde resol having a phenol to formaldehyde molar ratio of between 1:3.7; and (d) adjusting the pH of the final composition to between 8.8 and 9.2 with ammonium hydroxide.

18. A method as claimed in claim 17 wherein 1 part by weight of calcium silicate is added to the boric acid-sorbitol-dicyandiamide component prior to step (c).

19. A high temperature resistant, thermosetting, water-dilutable binder composition suitable for use in the manufacture of thermally stable bonded mineral fiber structures, comprising in a ratio of between 1:2 and 1:3 parts by weight of boric acid-hydroxyl-amide component and a phenol-formaldehyde resol to which urea has been added, said composition having a pH adjusted to fall in the range of about 8.5 to 9.5, said boric acid-hydroxyl-amide component being prepared by mixing at a temperature of about 20° to 80° C. in an aqueous medium 1 mole of boric acid with about 0.9 to 2 moles of a soluble hydroxyl compound chosen from diol, polyol, aldose and ketose and adding 0.5 to 1.5 moles of a nitrogen containing compound chosen from dicyandiamide, melamine and guanidine; and said phenol-formaldehyde resol-urea mixture having a pH in the range of 7.5 to 10 and containing urea in a ratio of phenol-formaldehyde to urea between 70:30 and 40:60 parts by weight, and said phenol-formaldehyde resol having a phenol to formaldehyde molar ratio of between 1:3 and 1:4.5.

20. A binder composition as claimed in claim 19 wherein the boric acid-hydroxyl-amide component further includes about 0.05 to 0.15 moles of calcium silicate per mole of boric acid.

21. A binder composition as claimed in claim 19 or 21 wherein the phenol-formaldehyde resol-urea mixture contains urea in a ratio of phenol-formladehyde to urea between 60:40 and 50:50 parts by weight.

22. A binder composition as claimed in claim 19 or 20 wherein the phenol-formaldehyde resol-urea mixture contains urea in a ratio of phenol-formaldehyde to urea to 54:46 parts by weight.

23. A binder composition as claimed in claim 19 or 21 the pH of which is in the range of 8.8 to 9.2.

24. A binder composition as claimed in claim 19 or 20 wherein the hydroxyl compound is selected from the group consisting of sorbitol, mannitol, pentaerythritol, glycerol or mixtures thereof.

25. A binder composition as claimed in claim 19 or 20 wherein the hydroxyl compound is sorbitol.

26. A binder composition as claimed in claim 19 or 20 wherein the nitrogen containing compound is dicyandiamide.

27. A binder composition as claimed in claim 19 or 20 wherein the hydroxyl compound is sorbitol and the nitrogen containing compound is dicyandiamide.

28. A high temperature resistant, thermosetting, water-dilutable binder composition suitable for use in the manufacture of thermally stable bonded mineral fiber structures, comprising 15 to 23 parts by weight of a boric acid-sorbitol-dicyandiamide component and 35 to 55 parts by weight of a phenol-formaldehyde resol to which urea has been added, said composition having a pH adjusted to fall in the range of about 8.5 to 9.5, said boric acid-sorbitol-dicyandiamide component being prepared by reacting at a temperature of 20° to 80° C. in an aqueous medium 3 to 5 parts by weight of boric acid with about 8 to 12 parts by weight of sorbitol and adding about 4 to 6 parts by weight of dicyandiamide; and said phenol-formaldehyde resol-urea mixture having a pH in the range of 7.5 to 10 and containing urea in a ratio of phenol-formaldehyde to urea between 70:30 and 40:60 parts by weight, and said phenol-formaldehyde resol having a phenol to formaldehyde molar ratio of between 1:3 and 1:30.

29. A binder composition as claimed in claim 28 the pH of which is in the range of 8.8 to 9.2.

30. A binder composition as claimed in claim 28 wherein the boric acid-sorbitol-dicyandiamide component further includes about 1 part by weight of calcium silicate.

31. A binder composition as claimed in claim 28 wherein the phenol-formaldehyde resol-urea mixture contains urea in a ratio of phenol formaldehyde to urea between 60:40 and 50:50 parts by weight.

32. A binder composition as claimed in claim 28 wherein the phenol-formaldehyde resol-urea mixture contains urea in a ratio of phenol-formaldehyde to urea to 54:46 parts by weight.

33. A high temperature resistant, thermosetting, waterdilutable binder composition suitable for use in the manufacture of thermally stable bonded mineral fiber structures, comprising 20.6 parts by weight of a boric acid-sorbitol-dicyandiamide component and 45 parts by weight of a phenol-formaldehyde resol to which urea has been added, said composition having a pH of between 8.8 and 9.2, said boric acid-sorbitol-dicyandiamide component being prepared by reacting at a temperature of 60° to 65° C. in an aqueous medium 3.9 parts by weight of boric acid with 10.7 parts by weight of sorbitol and adding 5 parts by weight of dicyandiamide; and said phenol-formaldehyde resol-urea mixture having a pH of between 7.5 and 10 and containing urea in a ratio of phenol-formaldehyde to urea of 54:46 parts by weight, and said phenol-formaldehyde resol having a phenol to formaldehyde molar ratio of between 1:3.7.

* * * * *